April 8, 1969　　　R. F. ABELL, JR　　　3,437,080

VALVE TAPPET

Filed Nov. 13, 1967

INVENTOR.
ROY F. ABELL JR.
BY
*Yount, Raney, Flynn and Tardi*
ATTORNEYS 3,437,080
VALVE TAPPET
Roy F. Abell, Jr., Saginaw, Mich., assignor to Eaton Yale
& Towne Inc., Cleveland, Ohio, a corporation of Ohio
Filed Nov. 13, 1967, Ser. No. 682,401
Int. Cl. F01l 1/14
U.S. Cl. 123—90         11 Claims

ABSTRACT OF THE DISCLOSURE

A valve tappet includes a body member which is engageable with a cam member having a base circle or dwell portion and an actuating portion. A socket member is carried by the body member and has a fluid passageway therein to provide for fluid flow to a push rod member operatively connected with a valve of an internal combustion engine. Fluid pressure provides a clearance between the body member and the socket member and through which fluid flows when the body portion of the lifter is in engagement with the base circle portion of the cam. Upon raising movement of the body member of the lifter, the clearance is closed and sealed so as to block flow of fluid to the fluid passageway in the socket member.

---

The present invention relates to a valve tappet, and particularly relates to a mechanical tappet having a body member which is moved by a cam and, when moved, effects movement of a socket member to effect opening of a valve associated with an internal combustion engine.

An important object of the present invention is the provision of a new and improved tappet which is constructed to provide reliable metering of the fluid flow to the push rod and which is easily manufactured and does not involve extremely close tolerances.

Another object of the present invention is the provision of a new and improved reliable tappet wherein metering of the fluid flow is effected by surfaces of the tappet and does not rely on other engine parts or tolerances thereof.

A further object of the present invention is the provision of a new improved tappet which includes a body member and a socket member having a fluid passageway therethrough, and wherein the body member upon upward movement has a portion which engages the socket member and effects upward movement of the socket member and wherein metering of the flow of fluid to the socket member is effected by metering surfaces located on the socket member and the body member.

A still further object of the present invention is the provision of a new and improved tappet which includes a body member and a socket member having a clearance provided therebetween when the body member engages a dwell or base circle portion of a cam which controls the movement of the body member, and wherein the clearance is closed upon upward movement of the body member to block flow of fluid through the socket member during the upward stroke of the body member and socket member.

Another object of the present invention is the provision of a new and improve tappet, as noted in the next preceding paragraph, wherein a metering fluid passageway is defined by cooperating surfaces on the body member and the socket member and through which fluid flows while the body member engages the base circle portion of the cam and wherein the flow of fluid through the metering passageway is blocked by the engagement of portions of the body member with portions of the socket member during the upward movement of the socket member.

Still another object of the present invention is the provision of a new and improved tappet which includes a body member and a socket member, and which includes means operable to seal the flow of fluid to a fluid passageway in the socket member upon upward movement of the body member.

Further objects and advantages of the present invention will be apparent to those skilled in the art to which it relates from the following detailed description of a preferred embodiment thereof, made with reference to the accompanying drawing forming a part of this specification and in which.

Figure 1:
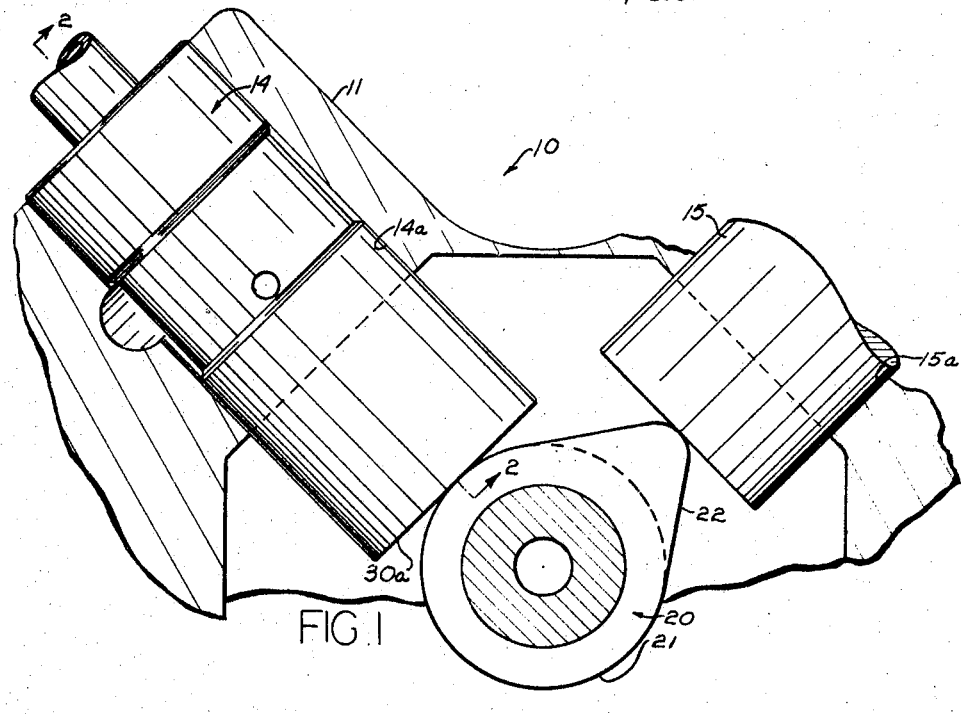
FIG. 1 is a schematic elevational view of a pair of tappets constructed according to the present invention and located in a V-eight internal combustion engine block.

The present invention provides an improved tappet, and particularly provides an improved mechanical tappet. A tappet embodying the present invention may be used in a variety of engine environments, and is illustrated herein as being applied to a V-type internal combustion engine 10.

The internal combustion engine 10 includes an engine block 11 and tappets 14, 15 located in bores 14a, 15a, respectively, in the engine block 11. The tappets 14, 15 are slidable in the bores 14a, 15a, respectively, and each effects actuation of the rocker arm assembly and valve, not shown, with which the tappet is associated. The tappets are moved in the bores by a cam member 20. The cam member 20 has a base circle or dwell portion 21 and an actuating portion or lobe 22. When the base circle portion 21 of the cam is in engagement with the tappets 14 or 15, the tappets are in a lower position and no movement of the tappets is effected by the base circle portion 21 or the cam 20. However, when the lobe portion 22 of the cam engages tappets 14 and 15 and rotates with respect thereto, the tappets are reciprocated generally vertically in the bores 14a, 15a, respectively.

The tappets 14, 15 are constructed in a similar manner and only the tappet 14 will be described herein in detail. The tappet 14 includes a body member 30 and a socket member 31. The socket member 31 has a push rod seat 32 which engages a push rod 33. The push rod 33 upon movement effects actuation of the rocker arm assembly and a valve which are associated with the internal combustion engine in a well-known manner. The specific constructions of the rocker arm assembly and the valve do not form a part of the present invention and therefore are not shown in the drawing nor will they be described in detail. The push rod 33 has a fluid passageway 34 extending therethrough for directing fluid from the tappet 14 upwardly to the rocker arm assembly.

Figure 2:
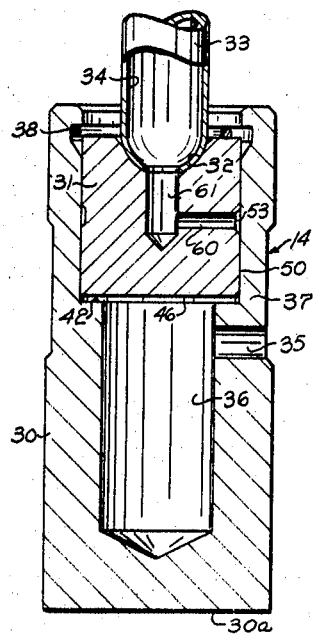
FIG. 2 is a cross-sectional view of a tappet shown in FIG. 1, taken approximately along the section line 2—2 of FIG. 1.

The body member 30 has an opening 35 in the side portion thereof which communicates with a suitable lubricant pump for directing lubricant into a chamber 36 defined by the body member 30. The upper end of the body member 30, as viewed in FIG. 2, is counterbored so as to provide a shoulder 37 at the upper end thereof. The socket member 31 is located at the uper end of the body member 30 and is located above the shoulder portion 37 of the body member 30, as shown in FIG. 1. A snap ring member 38 secured in the body member 30 holds the socket member 31 in position in the body member 30, as is well known. The cam 20 engages the lower surface 30a of the body member.

The tappet 14 is constructed so as to provide for fluid flow to the push rod passageway 34 when the base circle portion 21 of the cam 20 engages the body member 30. In order to provide for a fluid passageway for flow of fluid to the fluid passageway 34, when the base circle portion 21 of the cam 20 engages the body member 30, the tappet 14 is constructed so that a clearance 42 between the socket member 31 and the body member 30 is provided to enable fluid to flow therebetween. The clearance 42 is provided by engine oil pressure acting on the undersurface 46 of the socket member 31. This oil pressure in combination with valve gear lash provides the clearance 42.

As a result of the provision of the clearance 42, fluid flows from the fluid pump through the opening 35 in the body member and into the chamber 36. The fluid then flows from the chamber 36 through the clearance 42, and vertically through a metering passageway 50. The metering passageway 50 is defined by the distance from surface 46 to the edge 53a of collector groove 53 and by the diametrical clearance between them. The collector groove 53 is illustrated as formed in the outer diameter of the socket 31, but alternatively could be formed in the inner diameter of the body 30. Moreover, the collector groove 53 could be eliminated by using a cross-drilled hole all the way through the socket.

The metering passageway 50 controls the flow of fluid upwardly therethrough, and restricts the flow of fluid therethrough. Metering may be controlled by varying the distance from the surface 46 to edge 53a of groove 53 and/or by varying the diametrical clearance between the socket and body which defines passageway 50. The fluid flows upwardly through the metering passageway 50 to a radially extending passageway 60 in the socket member 31. The radially extending passageway 60 in the socket member 31 communicates with a vertically extending passageway 61 which intersects the passageway 60 and which communicates with the passageway 34 in the push rod 33.

From the above it should be apparent that lubricating fluid is directed through the tappet to the rocker arm assembly associated with the push rod 33 when the base circle portion 21 of the cam 20 engages the body 30 of the tappet. At this time, the fluid flows through the opening 35 and into the chamber 36 in the body member 30. The fluid then flows through the clearance 42 and upwardly through the metering passageway 50 and into the passageways 60, 61 which comprise a flow passageway through the socket member to the push rod 33. In this manner, during the entire time that the base circle portion 21 of the cam 20 engages the tappet, lubricating fluid flows through the tappet and upwardly with respect to the push rod 33 to the rocker arm assembly.

Due to the fact that the metering at this time is effected by the cooperating association of the surfaces 51, 52, there is no problem created by metering between an engine part and the tappet as is known in the case of mechanical lifters. As a result, effective flow control of the fluid can be maintained by the construction of the tappet itself without concern over tolerances on engines parts which are not an integral part of the tappet. Moreover, due to the fact that the tappet body 30 inherently rotates somewhat, as is known, in its bore in the engine block and relative to the socket member 31, the metering surfaces 51, 52 are inherently self-cleaning.

When the actuating portion or lobe portion 22 of the cam 20 engages and moves relative to the surface 40 of the body member 30, the body member 30 is moved upwardly to effect a raising movement of the push rod 33 and effect an opening of the valve member associated with the internal combustion engine, and then moves downwardly. The downward movement of the tappet 14 is effected by a spring, not shown, which biases the engine valve closed and effects closing thereof, as is well known.

Figure 3:
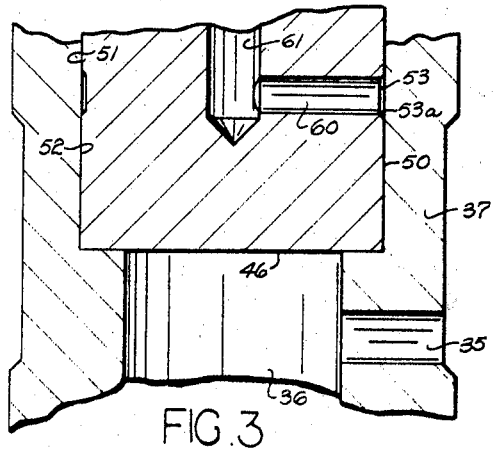
FIG. 3 is a sectional view on an enlarged scale of a portion of the tappet shown in FIG. 2.

The tappet 14 is illustrated in FIG. 3 in its condition when the lobe portion 22 of the cam 20 is actuating vertical movement of the valve tappet 14. As the lobe portion 22 engages the surface 40 of the body portion 30 of the valve tappet 14, the body portion 30 is moved vertically. When valve gear lash is removed by the lifting of the tappet body 30, the clearance 42 is closed due to engagement of the shoulder portion 37 of the body member 30 with the undersurface 46 of the pocket member 31. Upon engagement of the shoulder portion 37 with the undersurface 46 of the socket member 31, fluid flow is blocked thereby. Thus, fluid flow from the reservoir 36 to the metering passageway 50 is blocked and, thus, substantially no flow occurs between the surface 45 and the shoulder 37 of the socket and body members, respectively. Therefore, there is a stoppage or cessation of fluid flow through the push rod member 33 and, as a result, no fluid flows to the rocker arm assembly during the lifting stroke of the tappet. Moreover, as long as the shoulder portion 37 and the surface 45 engage, there is a cessation of fluid flow to the rocker arm assembly. This engagement of the shoulder portion 37 and the surface 45 may continue during downward movement of the body member 30.

From the above, it should be apparent that fluid does not flow to the rocker arm assembly during substantially the entire time that the body member 30 is reciprocating. The fact that flow is stopped during substantially the entire movement of the body member 30, greater tolerances may be provided between the surfaces 51, 52. This should be clear due to the fact that a certain amount of lubricating fluid is desired to be directed to the rocker arm assembly through the push rod passageway 34 during one revolution of the cam 20. Since during movement of the tappet 14, no flow is directed through the passageway 34, more flow can be directed through the passageway 34 during the portion of cam rotation when the dwell engages the body 30. Since more flow is directed to the push rod passageway 34 during the dwell portion of cam rotation, the tolerances on the surfaces 51, 52 can thereby be greater and are less critical than if the flow to the push rod passageway 34 continued without cessation during any part of the rotation of the cam 20.

In view of the foregoing, it should be apparent that applicant has provided a new and improved valve tappet, and that certain modifications, changes, and adaptations may be made therein, and it is hereby intended to cover all such changes, modifications, and adaptations which come within the scope of the appended claims.

Having described my invention, I claim:

1. A valve tappet comprising a body member having a portion engageable with a cam member having a base circle portion and an actuating portion, a socket member associated with said body member and having a fluid passageway therein to provide for fluid flow therethrough, said socket member and said body member having engageable surfaces which effect an upward movement of said socket member upon upward movement of said body member and which are spaced and provide for fluid flow between said body member and said socket member when said body member and said base circle portion of said cam engage, said body member and said socket member having metering surfaces thereon which are cooperable to meter the fluid flow to said fluid passageway in said socket member.

2. A valve tappet as defined in claim 1 wherein said metering surface on said body member comprises an annular internal surface of said body member and said metering surface on said socket member comprises an annular peripheral surface on said socket member spaced from said annular inner surface of said body member.

3. A valve tappet as defined in claim 1 wherein said surfaces on said socket member and said body member which are engageable to effect upward movement of said socket member effect a sealing engagement therebetween to thereby block the flow of fluid therebetween to said fluid passageway, and have a clearance therebetween defining a fluid passage therebetween when said base circle portion of said cam engages said body member.

4. A valve tappet as defined in claim 3 wherein said engageable surfaces comprise a surface on a shoulder member of said body member and an end surface of said socket member.

5. A valve tappet as defined in claim 4 wherein said clearance is provided by fluid pressure acting on said bottom surface of said socket member.

6. A valve tappet comprising a body member having a portion engageable with a cam member having a base circle portion and an actuating portion, said body member having a cavity for holding lubricating fluid, a socket member engageable with a push-rod member, said socket member having a fluid passageway therein connecting the push-rod member in fluid communication with the cavity in said body member to provide for fluid flow to the push-rod member, said socket member and said body member having surfaces which are engageable upon an upward movement of said body member under the influence of the actuating portion of the cam member to effect upward movement of said socket member and to block the flow of fluid from the cavity in said body member to the push-rod member through the passageway in said socket member, said surfaces having a clearance therebetween when said body member and said base portion of said cam engage to provide for fluid flow through said fluid passageway in said socket member to the push-rod member while said body member and base circle portion of said cam engage.

7. A valve tappet comprising a body member having a portion engageable with a cam member having a base circle portion and an actuating portion, a socket member engageable with a push-rod member, said socket member having a fluid passageway therein to provide for fluid flow to the push-rod member, said socket member and said body member having surfaces which are engageable upon an upward movement of said body member to effect upward movement of said socket member, said surfaces having a clearance therebetween when said body member and said base portion of said cam engage to provide for fluid flow to said fluid passageway while said body member and base circle portion of said cam engage, and a metering passageway defined by an annular peripheral surface of said socket member and an annular inner surface of said body member and located between said first passageway in said socket member and said clearance.

8. A valve tappet comprising a body member engageable with a rotatable cam member having a base circle portion and an actuating portion, a socket member disposed in said body member and having a fluid passageway therein to provide for a flow of fluid therethrough, means defining a metering passageway between said body member and said socket member for metering the flow of fluid to said fluid passageway, said socket member and said body member having portions which are engageable to transfer motion from said body member to said socket member and block fluid flow to said fluid passageway upon engagement, said portions being engageable upon movement of said body member by said actuating portion of said cam member.

9. A valve tappet comprising a hollow body member engageable with a rotating cam member at one end and having a socket member disposed therein at the other end, said hollow body member defining a first fluid passageway spaced axially from said socket member for connecting said hollow body member with a source of lubricating fluid, said socket member engageable with a push-rod member and having a second fluid passageway therein to provide for the flow of lubricating fluid therethrough to said push-rod member, and means operable to provide a seal for the flow of lubricant to said second fluid passageway while enabling lubricant to flow into said hollow body through said first passageway upon an upward movement of said body member.

10. A valve tappet comprising a hollow body member engageable with a rotating cam member at one end and having a socket member disposed therein at the other end, said socket member engageable with a push-rod member and having a fluid passageway therein to provide for the flow of lubricating fluid therethrough, means operable to provide a seal for the flow of lubricant to said fluid passageway upon an upward movement of said body member, and a metering passageway defined by an annular peripheral surface of said socket member and an annular inner surface of said body member and which is located between the location of said seal and said fluid passageway in said push-rod member.

11. A valve tappet as defined in claim 10 wherein said means operable to seal the flow of lubricant to said fluid passageway comprises surface portions on said body member and said socket member which engage upon movement of said body member to block the flow of fluid therebetween.

References Cited

UNITED STATES PATENTS

| | | |
|---|---|---|
| 2,192,454 | 3/1940 | Rockstroh. |
| 2,326,883 | 8/1943 | Pierce et al. |
| 2,791,993 | 5/1957 | Hubbard et al. |
| 2,865,352 | 12/1958 | Thompson. |
| 2,874,685 | 2/1959 | Line. |
| 3,124,114 | 3/1964 | Voorhies. |
| 3,299,870 | 1/1967 | Bertsch et al. |
| 3,322,104 | 5/1967 | Abell. |

AL LAWRENCE SMITH, *Primary Examiner.*

U.S. Cl. X.R.

184—6